Jan. 19, 1971 W. EDER 3,555,798

MOWING APPARATUS

Filed Aug. 12, 1968

INVENTOR
WOLFGANG EDER

BY McGlew and Toren
ATTORNEYS

Header and metadata 3,555,798
MOWING APPARATUS
Wolfgang Eder, Wolfenbuttel, Germany, assignor to Gebruder Welger, Wolfenbuttel, Germany
Filed Aug. 12, 1968, Ser. No. 751,882
Claims priority, application Germany, Sept. 2, 1967, 1,582,502
Int. Cl. A01d 55/20
U.S. Cl. 56—295      3 Claims

ABSTRACT OF THE DISCLOSURE

The invention relates to a mowing apparatus having a pair of blades which rotate about a vertical axis. The peripheral portions of the blade have a helical periphery. The periphery of each blade has two opposed slits and the helical periphery rises from the edge of one slit to the edge of the opposed slit. A knife is affixed to the disc periphery adjacent to a slit at the lower helical portion. The blades overlap so that at the moment the helical edges of the adjacent blades are on the same horizontal plane, the helical edge of one blade rides in a slot on the adjacent blade.

---

The present invention relates more specifically to mowing apparatus and more particularly to such apparatus comprising at least two generally horizontal discs arranged for synchronized rotation in opposite directions about vertical axes arranged one beside the other. Further there are and peripheral knife means on the discs, the knife means on one disc being angularly offset in relation to the knife means on the other. Mowing apparatus having these features has been previously proposed for harvesting agricultural green crops such as grass, clover, and maize.

An important requirement which mowing apparatus of the above described type should be able to meet is that the mown or cut crop should be passed to the rear without difficulty. There is also the further requirement that each stalk or stem should only be cut once, that is to say it should not be chopped up into small lengths. A further requirement is that in certain applications the cut or mown crop should come to rest in a swath or windrow.

In accordance with prior proposals, the discs carrying the knife means were so arranged that the knife paths of two adjacent cutting means overlapped each other. In accordance with an early construction made in accordance with these proposals, the discs were covered by a plate affixed to a beam of the moving apparatus frame in such a manner that the knife means, which were in the form of teeth, only projected to the front. The removal of the mown crop to the rear was far from trouble-free since it did not slide properly over the cover plate in a rearward direction.

In accordance with another known construction, knives were affixed to spherical plate-like discs so that the paths of knives on adjacent discs overlapped. In accordance with a still further prior construction use was made of conveying drums rotating about vertical axes. These drums had, at their lower, a frusto-conical collar to which cutting knives were attached, so that cutting knives on adjacent drums overlapped. Although with these constructions there was a comparatively satisfactory removal of the cut or mown crop as compared with the case with the first prior art construction mentioned above, since the movement of plate-like discs or collars tended to entrain the mown crop to the rear, trouble was experienced with certain types of crops. In accordance with the type of crop, the closeness of the stand, and the water content, the stalks did not immediately pass out of the cutting lines of the knives but tended to be cut by one knife after the other before they were then finally removed by a centrifugal action. In consequence there was a chopping up of the mown crop and the swathes formed were not neat. Furthermore there was a disadvantage that the mown material sliding down on the rear side of the apparatus came into the path of action of the knives and was again chopped up.

In accordance with a construction described in an early printed, a hand lawn mower was to be provided with a mowing mechanism comprising pairs of star-shaped knives mounted for synchronized rotation in opposite directions about parallel axes, the individual plates of the knives being offset in relation to each other, and the paths of the knives being arranged to overlap. In order to cause lying grass to assume an upright position so that it could be cut by the edges of the knives, means were provided for producing an air current along the axes of rotation in an upward direction. This air current was caused by the rear side of each knife member being bent or rolled upwards so as to act as the blade of a propeller. However, such star-shaped knives or knife wheels are not suitable for agricultural green crops. The upwardly bent blades do not exert a conveying action on the cut crop to the rear end and tended to batter the ends of the stalks.

One object of the present invention is to provide a mowing apparatus which avoids the disadvantages of the above described previously proposed constructions.

A further object of the invention is to provide a mowing apparatus which cuts each crop stalk cleanly a single time.

A still further object of the invention is to provide a mowing apparatus which leaves the cut crop in a swath.

The present invention consists in a mowing apparatus comprising at least two generally horizontal discs mounted for synchronized rotation in opposite directions about vertical axes one beside the other and peripheral knife means on the discs. The knife means on one disc are angularly offset to the knife means on the other while the path of the knife means on one disc overlaps the path of the knife means on the other. According to the present invention each disc has a helical rising edge portion with radially projectig knife means attached at the helical end while its rising end is adjacent to, and at a higher level than radially projecting knife means.

Each disc has at least a single helical portion and there is at least a single radially projecting blade projecting from its lower end.

Alternatively there can be at least two such helical edge portions each of which has a blade radially projecting from its lower edge, the top end of each such helical portion being adjacent to and at a higher level than a blade on a succeeding such helical edge portion.

It has been found that with a mowing apparatus incorporating these features the once-cut stalks, irrespective of the type of crop, are forced upwards by the helically rising peripheral portions so that they are not engaged by the following blade and are passed to the rear, for instance on a transverse beam forming part of the mowing apparatus. Furthermore to the rear side of the discs, the mown stalks are thrown upwards by one of the following helical portions so that they are prevented from coming into the line of action of a knife again.

In accordance with a preferred feature of the invention, in front of each blade in the direction of rotation there is a generally radial interruption in the disc bordered on one side by the upper end of such a helically rising portion, and on the other side by the bottom of a helically rising portion.

In accordance with a preferred construction embodying the invention the paths of blades on adjacent discs are made to overlap as much as possible in order to make the steps which are due to the oblique setting of the mower in a forward direction, in the stubble as small as possible. On the other hand, there is the requirement, connected with safety and with preventing damage to the blades by obstacles, that the blades should only project slightly beyond the peripheries of the discs. In order to meet these two requirements the invention provides the further preferred feature that adjacent discs overlap peripherally.

The angular offset between blades on adjacent discs can be such that a blade on one disc overlaps a helically rising portion of the other disc at a peripheral position approximately halfway between the ends of this helical portion.

Preferably, also, the discs are mounted on top of a carrying transverse beam.

One embodiment of the invention is now described with reference to the accompanying drawing.

Figure 1:
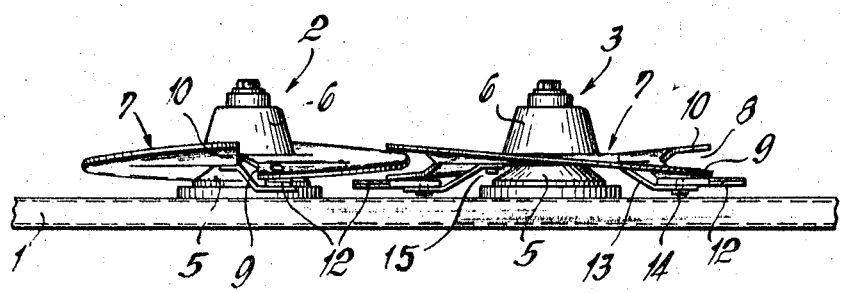
FIG. 1 is a front view of part of a mowing apparatus in accordance with the invention.
Figure 2:
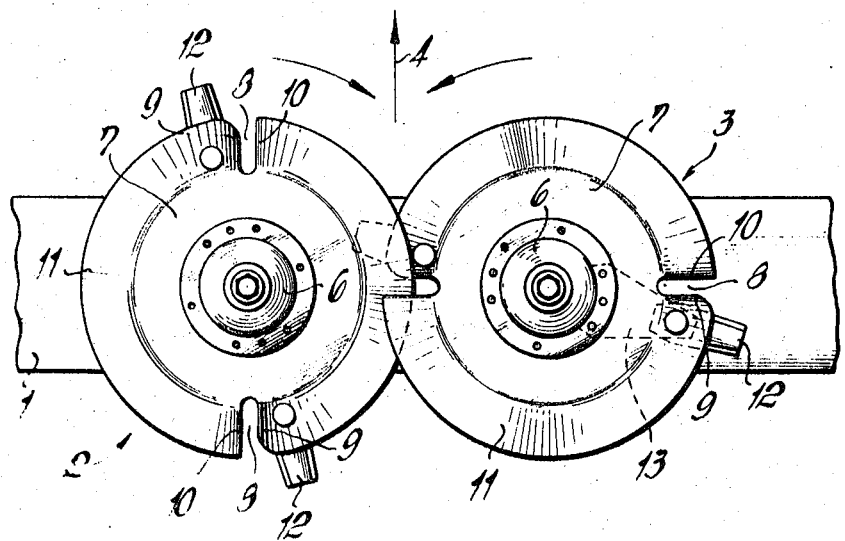
FIG. 2 is a corresponding plan view.

A moving apparatus comprises a transverse beam 1 forming part of a frame, which carries drive means, not shown, for the two cutting means 2 and 3. Further the cutting means are arranged along the beam in any suitable number having regard to the width of cut. The cutting means are mounted for synchronized rotation in opposite directions and adjacent means are driven in opposite directions. The direction of movement of the mowing apparatus during mowing is indicated by arrow 4 so that adjacent means rotate towards each other and where they overlap run counter to the direction of movement of the mowing apparatus. Each cutting means is journalled in a housing 5 on the beam 1 and comprises a hub 6 and a circular disc 7 which has two radial slits or slots 8 which is the trailing edge of slit 8 relative to the direction of disc rotation. The edge 9 of the slit 8 is at a lower level than the edge 10 and the peripheral part 11 of the circular disc rises helically between edges 9 and 10 of opposite slits 8 of each disc 7. At its lower most position, that is to say below disc edge 9 bordering on the slit, a mowing blade 12 is mounted which is held by a suitably bent strip spring 13 which is attached by screw means 15 on to the disc 7 and the hub 6. The blade is connected with the strip spring by means of a bolt 14 so that it extends in a radial direction and is pressed upwards against the periphery 11 of the disc.

The distance between cutting means 2 and 3 is, in the embodiment shown, less than their diameter. They are offset in such a manner that the periphery 11 of one disc 7 fits into the slit 8 of the next disc at the point both helical edges are in the same horizontal plane. Disc contact along the remaining disc rotating path intermediate the slots is prevented since the discs are helically formed so that the helical edge of one disc rides above the helical edge of the other disc during two opposite quadrants of the 360° rotation and below it during the remaining two opposed quadrants. The line between the diametrically opposed slits 8 are so arranged that the line between slits 8 on one disc 7, for example, on cutting means 2, is perpendicular to the line between the slits 8 on the other disc 7, for example, on cutting means 3, when the line between the slits 8 on cutting means 2 is approximately parallel with the arrow 4. Thus, the helical edges of adjacent discs are phased with the radical slots so that the edge of each disc rides in the slot of the adjacent disc when both discs rotate and the two helical edges are the same horizontal plane. In other words the overlapping blade overlaps the peripheral portion of the adjacent disc approximately halfway between its ends.

The blades 12 are mounted to the lowest parts of each disc so it will pass with a small clearance over the beam 1 underneath the adjacent disc. While the form of apparatus herein described constitutes a preferred embodiment of the invention, it is to be understood that the invention is not limited to this precise form of apparatus, and that changes may be made therein without departing from the scope of the invention which is defined in the appended claims.

What I claim is:

1. A mowing device for harvesting agricultural long stemmed green crops, comprising first and second closed-form horizontal discs, each having a substantially circular outer periphery, means rotatably mounting said first and second discs for rotation about substantially vertical axes with at least a portion of their peripheries overlapping during rotation, each of said first and second discs having an edge with at least one inwardly extending slit, but leaving the closed-form of said discs substantially unimpaired so as to avoid the raising of an air current by said discs during rotation thereof, said edge being vertically helical, said discs being constructed and arranged so that the edge of one passes through the slit of the other and vice versa during rotation, a knife carried on each of said discs and extending radially outwardly therefrom at a location adjacent the lowermost position of each edge of said discs, said knife of each disc being movable through a path overlapping the path of movement of said knife of the other disc, and said knives acting to convey the cut material in a swath toward the rear.

2. A mowing device, according to claim 1, wherein each of said first and second discs include two diametrically opposite slits extending inwardly from the periphery thereof, the edge portions of each of said first and second discs between slits being vertically helical, and wherein there is a knife on each of said first and second discs extending radially outwardly therefrom at locations adjacent the lowermost portions of each of said edge portions of said discs, said knives extending outwardly at diametrical opposite locations.

3. A mowing device, according to claim 2, wherein said knives at each diametrically opposite side each of said first and second disc extend along a substantially radial line adjacent each of the slits of said discs.

References Cited

UNITED STATES PATENTS

| 1,656,105 | 1/1928 | Durkee | 56—25.4 |
| 2,920,436 | 1/1960 | Benson | 56—295 |
| 3,103,094 | 9/1963 | Cook | 56—295 |

ANTONIO F. GUIDA, Primary Examiner